(12) United States Patent
Linnartz

(10) Patent No.: US 6,314,518 B1
(45) Date of Patent: Nov. 6, 2001

(54) SYSTEM FOR TRANSFERRING CONTENT INFORMATION AND SUPPLEMENTAL INFORMATION RELATING THERETO

(75) Inventor: Johan P. M. G. Linnartz, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/140,814

(22) Filed: Aug. 26, 1998

(30) Foreign Application Priority Data

Aug. 26, 1997 (EP) .................................................. 97202612

(51) Int. Cl.[7] ....................................................... G06F 1/24
(52) U.S. Cl. ........................ 713/176; 713/164; 713/16.5; 713/180; 380/201; 380/203
(58) Field of Search ..................................... 380/201, 203, 380/227, 229, 255; 713/164, 165, 176, 179, 180, 200, 201

(56) References Cited

U.S. PATENT DOCUMENTS

| 5,724,327 | | 3/1998 | Timmermans et al. ................ 369/48 |
| 5,905,800 | * | 5/1999 | Moskowitz et al. .................... 380/28 |
| 5,960,081 | * | 9/1999 | Vynne et al. ............................ 380/10 |
| 6,157,330 | * | 12/2000 | Bruekers et al. ..................... 341/143 |

FOREIGN PATENT DOCUMENTS

| WO 9713248 | 4/1997 | (WO) . |
| WO 9800040 | 1/1998 | (WO) . |
| WO 9800085 | 1/1998 | (WO) . |
| WO 9800087 | 1/1998 | (WO) . |

* cited by examiner

*Primary Examiner*—Thomas R. Peeso
(74) *Attorney, Agent, or Firm*—Michael E. Belk

(57) ABSTRACT

A system for copy protecting content information has an arrangement for receiving and controlling the playback of encoded video. The video content, e.g. MPEG compressed digital video, is watermarked and includes a control signal indicating the status (e.g. playback only, one generation of copy allowed, etc). In the receiver device a check is performed to allow playback in dependence of the watermark. The watermark is extracted in a separate decoder device, such as an external MPEG decoder. The receiver device starts the playback via the external decoder, and the separate decoder communicates retrieved watermark information via a link to the playback device. The playback device checks the watermark information against further supplemental information, such as a physical mark on the record carrier or the control signal. Said communication may be protected by cryptographic methods, such as a digital signature.

18 Claims, 3 Drawing Sheets

Figure 1:
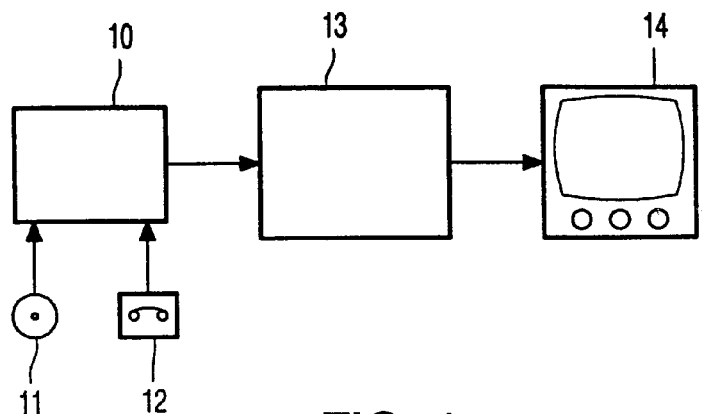

SYSTEM FOR TRANSFERRING CONTENT INFORMATION AND SUPPLEMENTAL INFORMATION RELATING THERETO

The invention relates to an arrangement for receiving via a transfer signal encoded content information and supplemental information, which content information comprises a watermark at least partly representing the supplemental information, the arrangement comprising a receiver device for receiving the transfer signal, a detector for detecting watermark information in dependence on the watermark, and a decoder coupled to an output of the receiver device for decoding the content information, which receiver device comprises control means for controlling the reproduction of the content information in dependence on the supplemental information.

Such a transfer system is known from WO 97/13248, document D1 in the list of related documents. In the transfer system information is transferred from the transmitter via a transfer signal to a receiver device, e.g. from a video producer via an optical disc to a disc drive for playback. The document describes that video and audio content is increasingly transmitted and recorded in a digitally encoded form, for example, an MPEG bitstream. There is a growing need to transfer supplemental information logically related to the content information, which supplemental information is intended for controlling the reproduction of the content information. The supplemental information may comprise information on the rights of the owner or originator of the content information. For example a marker is to be accommodated in such an encoded signal so as to classify the encoded signal as authentic program material. Marking digital signals is particularly useful in copy protection applications, wherein the supplemental information indicates the copyright status. Therefore the supplemental information should be protected against manipulation. The mark, also referred to as watermark, can effectively take the form of a multi-bit watermark pattern representing some supplemental information, e.g. indicating that the encoded signal constitutes copy protected content. In a digital video system, e.g. based on the digital videodisc (DVD), copy control can be based on detection of electronic watermarking. Watermarks are minor, imperceptible modifications to the video, which can be detected electronically. Such watermarks can be resistant to typical signal processing, including format conversions (e.g. PAL to NTSC), and can be detected to retrieve copyright information about the video. Watermarks are used for playback control. The basic idea of playback control is that any drive refuses to pass video content if that content contains a watermark that classifies the video as being no-copy while that video is found on a recordable medium. Hence playback control requires detection of the watermark within the drive, and a detector should be on the same chip as the drive control electronics or on the same circuit board in the drive. Noise-like, pixel-domain watermarks are not suitable for detection by a detector in the receiver device, because the complexity of the detector has to remain below a few thousand gates, as drives and DVD RAM recorders are designed as simple storage devices without any 'intelligence' to interpret data. Watermark detection would imply that such devices have process the content data, e.g. to demultiplex and interpret MPEG video streams, at least including run-length Huffman decoding of DCT coefficients. Hence a requirement of simplicity of playback control can not effectively be met by pixel-domain watermarks. So the known system has the problem, that the drive must be provided with a complex watermark detector.

It is an object of the invention to provide a more flexible system for controlling the playback of content information in dependence of supplemental information. For this purpose, the system according to the invention is characterized in that the arrangement comprises a decoder device comprising the decoder and the detector, which decoder device is arranged separately from the receiver device, and in that the receiver device and the decoder device comprise linking means for communicating the watermark information between the detector and the control means. This has the effect, that the complex content information decoder, which is present in a reproduction device, is used to perform the detection of the watermark, and communicates the result back to the receiving device. The receiving device controls the output signal in dependence of the communicated results. This has the advantage, that a high quality watermark, embedded within the encoded content signal, can be detected with very low additional complexity of the receiving and decoding arrangement.

According to a first aspect of the invention a receiver device for use in the arrangement is characterized in that the linking means are arranged for communicating with the decoder device for receiving the watermark information. According to a second aspect of the invention a decoder device for use in the arrangement is characterized in that the linking means are arranged for communicating with the receiver device for transmitting the watermark information. This has the advantage, that both devices can be produced separately and the total system cost is low, while a high quality watermark is used resulting in a high resistance against manipulation of the supplemental information.

An embodiment of the receiver device or the decoder device is characterized in that the linking means comprise means for securing the communication against tampering. In particular, the means for securing the communication comprise means for encryption or decryption, and/or for authentication, and/or for exchanging random numbers, and/or for providing or verifying a digital signature. This has the advantage that malicious parties are facing additional difficulties when trying to manipulate the supplemental information.

Figure 2:
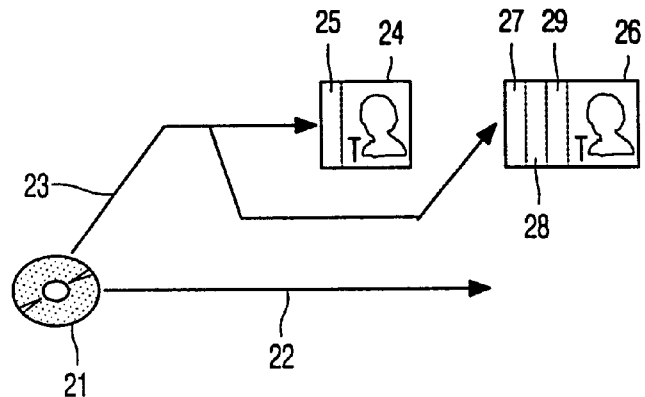
Figure 3:
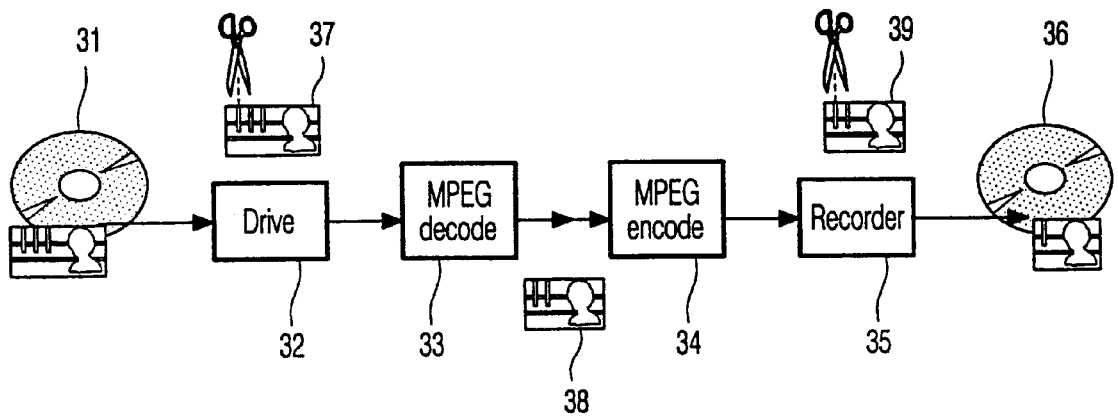
Figure 4:
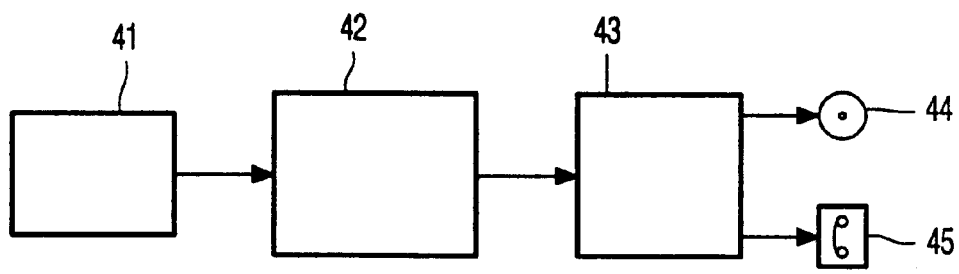
Figure 5:
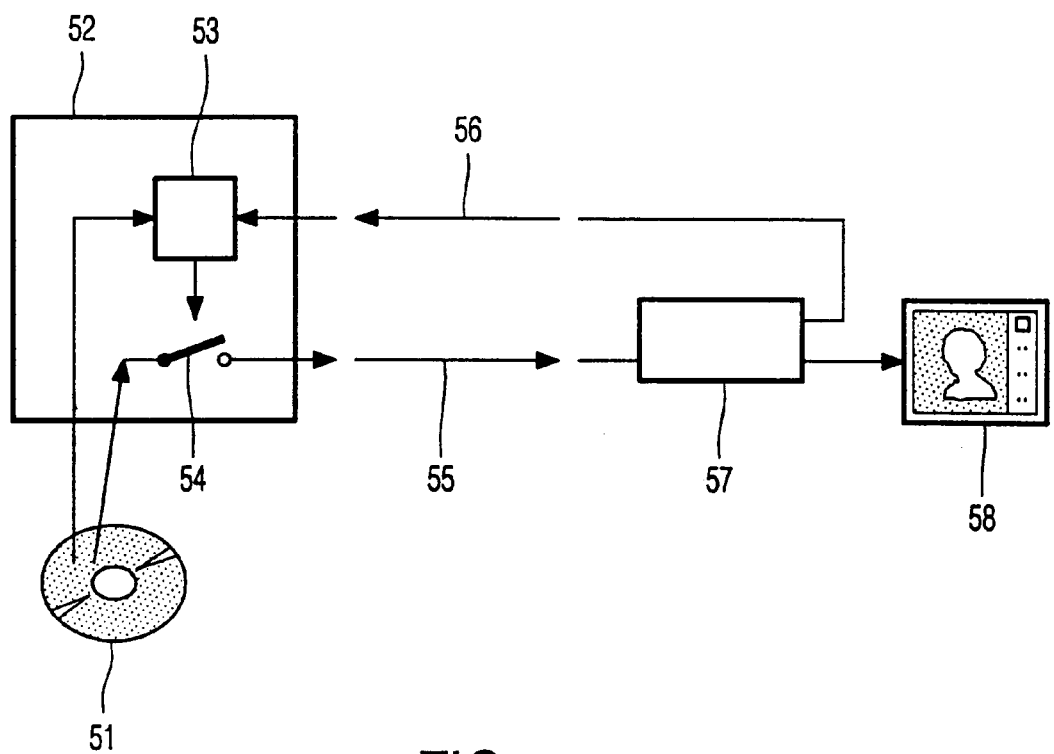
Figure 6:
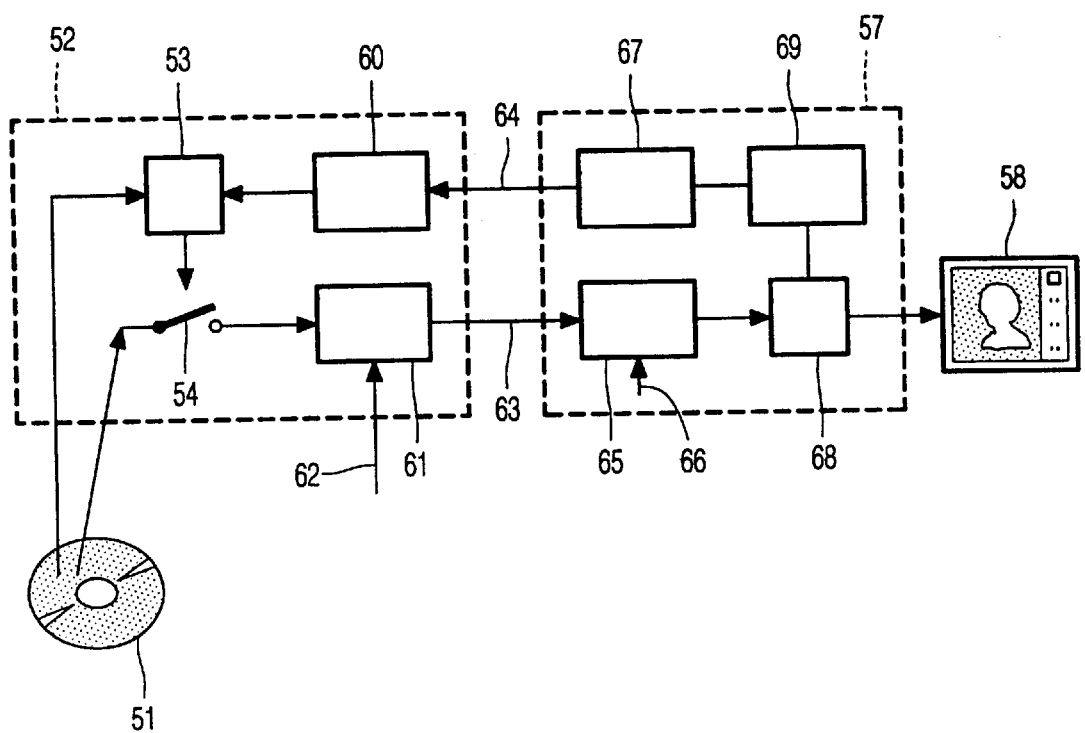

These and other aspects of the invention will be apparent from and elucidated further with reference to the embodiments described by way of example in the following description and with reference to the accompanying drawings, in which FIG. 1 shows playback control and the basic flow of video content, FIG. 2 shows a one-copy feature, FIG. 3 shows the function of the copy-once ticket, FIG. 4 shows the generation of a valid copy on a recordable carrier, FIG. 5 shows a system with separate watermark detection, and FIG. 6 shows a system with separate watermark detection and a secure link.

Corresponding elements in different Figures have identical reference numerals.

An important application of the invention is copy protection, the supplemental information being copy control information. A system for copy protection of recorded signals, an information carrier and reading device are known from EP-0545472 (document D2). Further relevant details about adding watermarks and control signal can be found in the related documents D3, D4 and D5. In the description below a complete copy control system is described not only including a technology for electronic pixel-domain watermarking, but also methods to resolve remaining system issues relating to the embedded signalling of copyright states. In particular, this system has been developed taking the following systems aspects into account. Casual home copying can effectively be stopped by fairly simple technical measures. Large scale pirates have ample technical means to circumvent any protection, because the number of these large operations is limited, they can be challenged in court. However, the category in between, the small-scale pirates running cottage or garage factories, may be too small to attack through legal actions. Meanwhile these pirates often have sufficient facilities for tampering with recording devices, to overcome conditional record protection measures of their own equipment. However, pirates have no access to the devices installed in the homes of their potential customers. This suggests that the best measure against small scale piracy is playback control. Playback control is regarded as an important to the strength of a copy control system. The system includes playback control because it can be conducted in a simple disc drive or other storage device which does not have facilities to process and interpret the stored "bits and bytes". It is a technological challenge to conduct playback control in spite of the "dumbness" of such drives. A common attack on copy protection based on Record Control only is that a pirate disables the watermark checking functionality. Conditional playback avoids that discs produced by such hacked recorder can be played. This is reflected in the requirement that a watermark can be read in appropriate (digital) domains and with limited complexity. The current state of the art enables the use of electronic watermarking for copy control. Complexity of detector is a problem. Typically, detection is feasible as part of the MPEG compression or decompression algorithm. On the other hand, in order to come to a reliable copy control scheme, detection has to be performed at the (playback) drive and the recorder. A watermarking method is required that allows a copy-once feature, which is described in document D5. The copy-once mechanism included in this system is designed such that it does not provide a hook for hackers to break the strength of the entire copy control system. It should be considered as a general rule that adding extra features to the copy control system, which allow copy-once or which allow users to record their own personal creations facing minimal restrictions, should not compromise the security of the copy control concept. While the watermark detection has to be simple and computationally inexpensive, it has to withstand signal processing applied to the content. Upgrading copy-control measures has several disadvantages. Compatibility requirements limit the extent to which systems can be modified. Moreover, a scenario in which iteratively hackers break the system and the industry increases the measures is costly and ineffective. Hackers become strongly motivated by initial successes and committed to again breaking any improved systems. Starting the protection through a sufficiently strong barrier, as presented in this system, avoids that pirates can break the system at reasonable cost and easily earn profits from their activities.

FIG. 1 shows playback control in a playback system and the basic flow of video content. The video content is physically transferred to a receiver device 10, e.g. a drive reading information from a record carrier such as an optical disc 11 or a tape 12. The receiver device retrieves the information from the record carrier and the retrieved information is passed on to a detector/controller 13, which detects copy protection information. If the video content is allowed to be displayed, the encoded content signal is decoded and a video signal is passed on to a Video monitor 14, e.g. a TV.

The detector/controller 13 inhibits playback, if a state 'Never-copy' is detected in combination with a Recordable media. Video content is watermarked with data indicating a variety of attributes. This includes copy said protection states. The copy protection states which are considered are: a) one-copy, b) no-more-copy, c) never-copy and d) free copy. In an embodiment the content contains one of two categories of watermarks, either the watermark classifies the content as status a or b or as status c. Distinction between state a and b is provided by a control ticket. The system concept is arranged for effective copy control, distinguishing the roles of DVD drives, MPEG decoders, encoders and DVD RAM encoders for (re-)encoding in the home environment. In its most basic form the player or drive tests the copyright state of the content and refuses to play content that is illegally found on media that are not original. In an embodiment the medium contains a physical mark which at least distinguishes Read Only (RO) and RAM discs. An important function of the system is to prohibit playback of state c content from non-original media. A first improvement is to cryptographically relate the physical mark to the watermark of the content as described in document D4. It is cryptographically unfeasible to compute the physical mark from the watermark content. This physical mark is embedded on the disc but cannot be read or recovered externally of the drive. During mastering of the RO disc, the bit content of the physical mark is generated from seed information provided by (and only known to) the content owner. Physical markers reserved for RO and RAM can be distinguished from one another. For a casual copier it is impossible to insert the physical mark of RO content on a recordable disc, even if he happens to know the bit content of the physical marker. It should also be recognized that small-scale piracy will be attempted, using read-only disc-pressing equipment. This is already a common method used for large and small scale pirating of audio CDs and CD ROM's. It becomes economically attractive to publish on (silver) CD RO instead of (golden) CD Recordable, if the size of the order is above about a few hundred discs. This shows that small scale piracy through RO is attractive already at small quantities. Similar attacks with DVD read-only is not adequately countered if the detector in consumer players only check for recordable and read-only media, without checking the relation between the origin of the read-only medium and its content. For a small scale pirate who wants to order a publishing house to press a certain quantity of discs, it is technically difficult to find the bit value of the physical marker. Moreover, he would have to provide the publishing house with the seed, instead of the physical marker itself. It is cryptographically unfeasible to compute the seed from the physical mark. RO Discs produced with a generic physical mark will not play content with a specific watermark that requires a particular bit combination of the physical mark.

FIG. 2 shows a one-copy feature. The record carrier 21 carries watermarked video content 22, but also carries separate control signal, e.g. a copy control ticket(s) T such as a Play Ticket 25, having a state token 'Playback only' 25, and/or a Copy Ticket 26 having three consecutive tokens for Playback only 27, Record 28 and Playback copy 29. One copy content is watermarked, such that it can be detected as being in state a or b. Any recorder and any player which detects such watermark, assumes that the content is in state b (no more copy) unless an explicit authorization for recording or playback is granted in the form of the cryptographic ticket T. This ticket can be stored on a legally copyable disc or included during transmission. Essentially, playback and recording of watermarked material only occurs if the appropriate authorization ticket is present. For copy-never content, the play ticket is provided as a physical mark on the disc. For the playback control as it is effectuated by a drive, the playback rules are now as follows. Playback of content is allowed if one of the following situations apply:

The content is watermarked in state c and the physical mark agrees with the watermark in the content The content is watermarked in state a/b and the authorization mark agrees with the watermark in the content.

The content has no watermark, i.e., state d (free copy)

FIG. 3 shows the function of the copy-once ticket. A record carrier 31 is played by drive 32, which also retrieved the ticket T and removes one token illustrated by clipping action 37. The drive must pass a 'clipped' copy ticket 38 to its output, optionally after an MPEG decoder 33. The ticket 38 must allow a recorder 35 to copy the content (optionally after an encoder 34) and a next player to play the copied content. After these transitions, no further copies are possible. The ticket changes state during every passage of a playback and recording device. Such state modifications are cryptographically irreversible and reduce the remaining copy and play rights that are granted by the ticket. The ticket is clipped (cryptographically modified) during each playback or recorder passage. The system allows the casual consumer to make any number of first generation copies from the original. Subsequent copy is recognized such that additional serial copies would not be allowed. In this case the recording drive system would detect the "one-copy" state and modify the first state or record an additional state on the recordable media to indicate that the content is now copy protected (i.e. "no-more-copy"). Subsequent detection by the above control systems would prevent recording and allow playback.

FIG. 4 shows the generation of a valid copy on a recordable carrier. An original record carrier containing video or audio is played back in a playback system 41. A recordable media 43, such as an optical disc 44 or a tape 45, is recorded in recording drive system 42. The recording drive system 42 records only, if the 'one-copy' state is detected, and then also the state is modified to 'no-more-copy' on the recordable media. The basic record control is designed to prevent a casual consumer from copying "never-copy" and "no-more-copy" material onto a recording device. The recording device would detect the watermark and inhibit copy of the content, if 'Never-copy' or 'No-more-copy' state is detected. The modified state is passed on the recordable carrier as a new ticket T. The ticket contains multiple validation tokens. During each playback and recording step, one token is removed. Ticket T carries the information about how many generations of copies still are allowed. It indicates the number of sequential playback and recordings that can be done. For a no-copy signal, T specifies that only playback is allowed. A copy-once signal on a professionally-produced disc carries a ticket for 3 passages: playback, recording, followed by another playback. When in transit from a player to a recorder, such a signal carries a ticket for 2 passages. Since Ticket T is related to the watermark W, a ticket for a given title can not be misused to record another title. The ticket acts as a cryptographic counter that can be decremented but not incremented. The counter value is decremented by feeding the bits through a cryptographic one-way function. This implies that ticket T in the stream is replaced by T'=F(T) during each recording or playback operation, whereby F is a publicly known cryptographic one-way function. Neither the player nor the recorder pass T transparently. The system does not rely on a global secret. From a cryptographic point of view it is not necessary that F is kept secret to potential attackers.

A playback device always checks the Physical mark P on the disc. If the devices plays video, it always passes the copy control ticket through the one-way function. Playback will only take place if one of the following conditions is met: The disc contains a physical mark P reserved for professional content. The content on the disc contains a watermark W. The player further checks the validation ticket. Playback occurs if one of the following conditions is met:

| Copy never | The relation W = F(P) is satisfied. |
|---|---|
| Copy-once | T is present, and equals F(P). |
| | The relation W = F(F(F(T))) is satisfied. |
| No-more Copy: | The relation W = F(P) is satisfied. |

The disc contains a physical mark P reserved for recordable media. The content contains a valid W watermark used for professional recording. The validated copy-once T is present, and W=F(T). Alternatively the content is identified as a home recording of a user's personal creation (e.g. by checking watermark)

The recorder always passes the copy control ticket through the one-way function before transferring it to disc. Recording of copyrighted content is allowed only if the watermark in the stream matches W=F(F(T)). If an attacker manages to modify his recorder and record audio even if the appropriate T is not present, a normal player will reject to playback the disc.

A professional title is produced by initially generating a seed U. From this seed, the following variables are computed: P=G(U), and T=(F(F(U)) which we denote as $F^2(U)$. For a disc that the customer is allowed to copy n-times, a watermark W is created as $W=F^{2n+1}(T)$. The one-way function G and variable P may be specified such that P also contains an identifier for the publisher or a serial number of the mastering machine. If a pirate publisher attempts to write a particular P, in order to make a bit-exact copy of a copyright disc, that pirate must tamper with his DVD press.

The above scenario assumes watermarks to be detected with the drive and within the recorder. However, pixel-domain watermarks are not suitable for detection by most ordinary digital devices in the chain if the complexity of the detector has to remain below a few thousand gates. Drives and DVD RAM recorders are designed as simple storage devices without any 'intelligence' to interpret data. Watermark detection would imply that such devices have to demultiplex and interpret MPEG streams, at least to the depth of run-length/Huffman decoding of DCT coefficients. On the other hand, it appears to be critical to the strength of the copy control system that play and record control is effectuated within the drive and within the recorder, rather than 'somewhere' half-way the chain. These requirements (simplicity and effective location of play/record control) can not be met simultaneously by pixel-domain watermarks, but can be met by introducing MPEG "PTY" marks as described in document D1. Within the MPEG standard the parameter 'picture type' is abbreviated as PTY, we adopt the name PTY marking for embedded signaling that is based on intentionally modifying the PTY sequence in a video stream. The disadvantage of PTY marks is their inability to survive analogue transmission. As shown in FIG. 3, the copying may be performed by decoding the MPEG signal and encoding the video again before recorded. So the system may use the properties of several techniques (pixel domain watermarks, MPEG PTY marks and physical marks and authorization ticket). An embodiment of the system concept combines various watermarking methods. Throughout the entire chain of content transmission, pixel domain watermarks are present, but effectively these are only detectable in MPEG decoders and encoders. The pixel domain watermark plays the role of inseparable carrier of copyright attributes. The most important property of the pixel-domain watermark is that it survives not only analogue transmission but also many digital manipulations.

It is understood that the reliability of this concept depends on whether the detection of recordable media can be misled. One method is to insert fake signals into the detection circuit that distinguishes between recordable and Read-Only media. Therefor the detection needs to be performed as much upstream, i.e. close to retrieving the signals from the record carrier, as possible, in particular in the drive. This implies that also the watermark check must be conducted "upstream". However, the inventors have seen that drives may playback without checking for watermarks if the watermark is detected separately. Preferably the watermark information is transmitted over a secure (confidentially against snooping, plus authentication and integrity) link to a compliant MPEG decoder.

FIG. 5 shows a system with separate watermark detection. A record carrier 51 carrying a physical mark P and video content watermarked with a watermark W, is played in a drive 52. The drive has information reading means 53, e.g. an optical read head, channel decoder, and an error corrector of a known type, such as for CD or DVD. The reading means also comprises a control unit which has the function to detect the physical mark P, and to control a control switch 54, which blocks the output in dependence of the copyright information. Alternatively or additionally a blocking switch or similar output enabling means can be located in the decoder unit, the output enabling means being controllable by the control unit in the drive via a forward link. The drive as shown in FIG. 5 can pass on clear content to a compliant MPEG decoder 57 via link 55, because the watermark detection takes place in the external MPEG decoder 57. The information about the presence of a watermark and possible the supplemental information carried by the watermark is transferred back to the drive via a link 56. In an embodiment the drive 52 electronically signs the content, and the compliant MPEG decoder 57 returns a watermark with appropriate signatures. The drive than checks whether the ticket is valid for content with that watermark. If the recorder and player accept to playback concept without a PTY mark, this opens several opportunities for attacks. A hacker may attempt to copy video content by offering it in uncompressed form to an MPEG encoder, which does not check for pixel-domain watermark. This stream is then offered to recorders and drives, which would pass the content. Effective copy control must therefor prohibit recording or playback of content that is free of PTY-mark, unless the drive can compare a pixel-domain watermark with a physical mark or ticket on the disc. If from a complexity point of view, the watermark detector can best be included into the MPEG decoder chip or at least on the decoder board, two options can be thought of for the location of the pixel-domain detector.

It should be anticipated that typical recording drive systems only receive bit and bytes, without side information about the contents. Recorders may accept marked content, e.g. PTY marked, if appropriate tickets are presented. Recorders may record content without checking for watermarks only if received over a (secure) link from a compliant MPEG encoder. Recorders may accept content without detecting the watermark itself, if the content plus a cleartext version of the watermark bits are signed by a compliant and authorized device (e.g. an MPEG encoder).

According to the invention the detection of the watermark is outside the drive, and takes place in a compliant decoder, e.g. an MPEG decoder. In a embodiment additional security measures are taken to further improve the copy protection, while playback control may still be effectuated in the drive. The secure system is protected against two attacks:

The attacker may replace the MPEG stream coming out of the drive by another stream, which has a free-copy status. The MPEG decoder will detect no watermark and report this to the drive.

The attacker may intercept the message from the MPEG decoder and replace it by a message that the MPEG is not watermarked (free copy)

The MPEG decoder, or a small entity (software or hardware) physically associate with the MPEG encoder, e.g. a chip on the decoder board, does the watermark detection. In the MPEG encoder substantial signal processing facilities are available, so the addition of a watermark detector usually does not excessively burden the overall complexity of the decoder.

In a first embodiment of the system, as shown in FIG. 5, no protection of the link is guaranteed by cryptography. If the drive unit is part of a PC system, an attacker may provide software algorithm to his customers that modifies signals floating over the PC bus, but customers may be less willing to accept such intervening software. Moreover these algorithms can not be place in consumer electronics (non-PC) DVD players. Thus the value of such copies are essentially reduced, and the first embodiment still provides acceptable copy protection.

FIG. 6 shows a system with separate watermark detection and a secure link. The secure link comprises a forward secure path 63 and a backward secure path 64. Like in FIG. 5 the record carrier 51 is played in a drive 52. The drive has information reading means 53, which comprise the control unit to control the control switch 54. The output is coupled to a compliant MPEG decoder 57 via forward secure path 63. The drive 52 comprises an encrypt unit 61 to encrypt the output signal from the drive using a crypto key 62, and the encrypted output signal is coupled via the forward secure path 63 to a decrypt unit 66 in the decoder 57. The decrypted output is passed on to the MPEG decoder 68, which is coupled to monitor 58 via the video output. A watermark detector 69 is coupled to the MPEG decoder 68, and any detected watermark information is encrypted in a second encryptor unit 67, and transferred via backward secure path 64 to the drive unit 52 and decrypted in decrypt unit 60, which passes the watermark information to the control unit in reading unit 53. In this second embodiment the link between drive and MPEG decoder is made secure by encryption. This implies that the drive and MPEG decoder must share a common secret. This secret can be time varying, if the two devices have a mechanism to generate a session key. This solution relies in confidentiality of the data. In its basic form, it does not protect against exactly bit-copying the data flow from drive to decoder.

In a third embodiment the drive unit and the decoder go through an authentication process first. For example, an existing encryption system like the Content Scrambling System (CSS) of the DVD could be used authenticate. Also the CSS scheme can be modified to perform the encryption and decryption functionality on the entire MPEG stream.

In a fourth embodiment the MPEG stream itself, which requires a high bit-rate is not encrypted, but the drives hashes, adds a random number and signs the MPEG stream using well known cryptographic algorithms like RSA or DSA. The MPEG decoder then verifies the signature, detects the watermark and send a message back to the drive. This message contains the retrieved watermark bits concatenated to the random number and the signature as it was placed by the drive, and MPEG decoder signs this message again. The random number avoids replay attacks, but is not absolutely necessary. Alternatively, the backward message may be encrypted, because for this message a low bit-rate is sufficient.

The above solutions have the disadvantage that cryptographic secrets need to be known by the drive and the MPEG decoder device. Moreover, encryption of the entire MPEG stream is not favorable.

In a fifth embodiment the burden of checking hashes is not placed with the drive or with the decoder, but instead is performed by the MPEG encoder. The compliant MPEG encoder already pre-computes a set of values, which it provides to the recorder and the drive.

The drives selects on of these values and uses this choice to challenge the MPEG decoder. It asks the decoder to perform the watermark check and to perform particular hash operation and to cryptographically sign the resulting numbers. This result is checked by the drive. For instance the MPEG encoder pre-computes several hash values over the MPEG content. The hash values are each computed in a slightly different manner, e.g. by concatenating a particular predetermined string $m_i$ to the content. Thus for various i (i=1, 2, N)

compute $h_i$=Hash[MPEG stream|$m_i$]

MPEG content plus the set of hash values are stored on the disc in encrypted form.

store $c_i$=Encrypt[encoder key|$h_i$]

The drive at random picks i, that is selects one of the hash functions and has values. The drive passes the MPEG but not the hash value to the MPEG decoder. The drive informs the MPEG decoder about which hash (which i) to compute. The MPEG decoder returns the watermark W, plus the appropriate hash value $h_i$ and signs this message.

store $s_i$=Encrypt[decoder key|$h_i$]

The drive then compares decoded versions of $s_i$ with $c_i$. If the encoder and decoder keys are identical the drive can simply check whether $s_i$=$c_i$.

In a sixth embodiment the drive unit comprises means for detecting the presence of content information on a record carrier, e.g. by detecting the structure of an MPEG encoded video signal. As soon as the content is detected a communication protocol with the MPEG decoder is started for exchanging watermark information as described above. Other content, such as computer programs, can be read from the record carrier without playback control. Alternatively all content read from the record carrier is routed to or via the MPEG decoder, and the MPEG decoder starts the protocol only if an MPEG signal is detected.

Although the invention has been explained by an embodiment using a disc as recording medium, it will be clear that other systems for transferring information can be employed in the invention. For example, the encoded signal and the control signal may be transferred via a data-network like the internet.

Whilst the invention has been described with reference to preferred embodiments thereof, it is to be understood that these are not limitative examples. Thus, various modifications may become apparent to those skilled in the art, without departing from the scope of the invention, as defined by the claims. For example, the encoded signal might be distributed on a read-only disc or tape, while the control signal might be distributed separately. Unlimited use of the control signal might be prevented by encrypting the control signal by a key known to the destination only, e.g. a key build in specific reproducing devices or a public key supplied by the destination using a public key system (e.g. RSA). Also the encoded signal and/or the control signal may additionally be protected by scrambling or encryption methods, or may be additionally provided with a digital signature. Further, the invention lies in each and every novel feature or combination of features, including those within the mentioned incorporated or related documents.

List of Related Documents (D1) WO 97/13248-A1 (PHN 15391) Watermarking encoded signals.
(D2) EP-0545472 (PHN 13922) Closed information system with physical copy protection
(D3) WO IB98/00040 (PHN 16209) Watermarking of Bitstream- or DSD-signals (A.A.M. Bruekers et al.)
(D4) WO IB98/00085 (PHN 16210) Copy protection method for storage media
(D5) WO IB98/00087 (PHN 16372) Copy control with copy n-times feature

What is claimed is:

1. An arrangement for reproducing encoded content information comprising:

receiver means for receiving a transfer signal containing supplemental information and encoded content information that includes a watermark at least partly representing the supplemental information, the receiver means including: an output for providing the content information, and control means for controlling reproduction of the content information depending on the supplemental information;

detector means for detecting watermark information depending on the watermark;

decoder means coupled to the output of the receiver means and for decoding the content information to reproduce the content information; and a decoder device including the decoder means and the detector means and arranged separately from the receiver means;

and linking means for providing the watermark information from the detector means to the control means.

2. The arrangement of claim 1, in which the linking means are arranged for communicating with the decoder device for receiving the watermark information.

3. The arrangement of claim 2, in which the control means include an output control switch for controlling the output of the content information from the receiver.

4. The arrangement of claim 1, in which the linking means are arranged for communicating with the receiver means for transmitting the watermark information.

5. The arrangement of claim 4, in which the decoder device is arranged for decoding video content information and for detecting a pixel domain watermark.

6. The arrangement of claim 4, in which the decoder device includes output enabling means, which are controllable by the control means in the receiver means via the linking means.

7. The arrangement of claim 1, in which:
the control means include an output control switch for enabling the output;
the receiver means includes reading means for retrieving the transfer signal from a record carrier;
the reading means are arranged to detect a physical mark on the record carrier, which physical mark is indicative of the origin of the record carrier;

the receiver means includes means for receiving a control signal which at least partly represents the supplemental information;

the control means are arranged for verifying a relationship between the control signal and the watermark information;

the receiver means includes recording means for recording the content information on a record carrier;

the control means are arranged for controlling the recording depending on the supplemental information;

the receiver means includes means for detecting the presence of content information on a record carrier;

the linking means are arranged for communicating with the receiver means for transmitting the watermark information;

the decoder is arranged for decoding video content information and for detecting a pixel domain watermark;

the decoder includes output enabling means, which are controllable by the control means in the receiver means via the linking means;

the linking means include means for securing the communication against tampering; and the means for securing the communication includes one or more of: means for encryption or decryption, means for authentication, means for exchanging random numbers, or means for providing or verifying a digital signature.

8. The arrangement of claim 2, in which the receiver means includes reading means for retrieving the transfer signal from a record carrier.

9. The arrangement of claim 2, in which:

the receiver means includes means for receiving a control signal which at least partly represents the supplemental information; and the control means are arranged for verifying a relationship between the control signal and the watermark information.

10. The arrangement of claim 2, in which the receiver means includes recording means for recording the content information on a record carrier; and the control means are arranged for controlling the recording depending on the supplemental information.

11. The arrangement of claim 2, in which the receiver means includes means for detecting the presence of content information on a record carrier.

12. The arrangement of claim 2, in which the linking means include means for securing the communication against tampering.

13. The arrangement of claim 12, in which the means for securing the communication include one or more of: means for encryption or decryption, means for authentication, means for exchanging random numbers, or means for providing or verifying a digital signature.

14. The arrangement of claim 13, in which the reading means are arranged to detect on a record carrier, a physical mark indicating the origin of the record carrier.

15. A receiver for receiving via a transfer signal, supplemental information and encoded content information that includes a watermark at least partly representing the supplemental information, the receiver comprising:

output means for providing information including the watermark to a detector for detecting watermark information;

control means for controlling reproduction of the content information depending on the supplemental information; and linking means for communicating the watermark information from the detector to the control means.

16. The receiver of claim 15 in which:

the receiver further comprises recording means for recording the content information on a record carrier;

the control means are arranged for controlling the recording depending on the supplemental information;

the receiver further comprises means for detecting the presence of content information on a record carrier;

the linking means are arranged for communicating with the receiver for transmitting the watermark information;

the linking means include means for securing the communication against tampering; and the means for securing the communication includes one or more of: means for encryption or decryption, means for authentication, means for exchanging random numbers, or means for providing or verifying a digital signature.

17. A decoder for decoding a transfer signal including supplemental information and encoded content information that includes a watermark at least partly representing the supplemental information, the receiver comprising:

detector means for detecting watermark information depending on the watermark;

decoder means for decoding the content information; and linking means for communicating the watermark information between the detector means and a control means of a receiver.

18. The decoder of claim 17, in which:

the linking means are arranged for communicating with the receiver means for transmitting the watermark information;

the decoder is arranged for decoding video content information and for detecting a pixel domain watermark;

the decoder includes output enabling means, which are controllable by the control means of the receiver via the linking means;

the linking means include means for securing the communication against tampering; and the means for securing the communication includes one or more of: means for encryption or decryption, means for authentication, means for exchanging random numbers, or means for providing or verifying a digital signature.

* * * * *